(12) United States Patent
Patapoutian et al.

(10) Patent No.: US 11,562,767 B1
(45) Date of Patent: Jan. 24, 2023

(54) MULTI-SECTOR READ OFFSET RECOVERY (71) Applicant: Seagate Technology LLC, Fremont, CA (US)

(72) Inventors: Ara Patapoutian, Hopkinton, MA (US); Jason Bellorado, San Jose, CA (US); Zheng Wang, Louisville, CO (US); William M. Radich, Berthoud, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/469,301

(22) Filed: Sep. 8, 2021

(51) Int. Cl.
| | |
|---|---|
| *G11B 20/18* | (2006.01) |
| *G11B 5/56* | (2006.01) |
| *G11B 5/55* | (2006.01) |
| *G11B 5/02* | (2006.01) |
| *G11B 5/596* | (2006.01) |

(52) U.S. Cl.
CPC ............... *G11B 5/556* (2013.01); *G11B 5/02* (2013.01); *G11B 5/5526* (2013.01); *G11B 5/59655* (2013.01)

(58) Field of Classification Search
CPC ............ G11B 5/5543; G11B 20/10388; G11B 21/12; G11B 5/5547; G11B 5/56; G11B 5/58; G11B 20/18
USPC ................................. 360/75, 77.07, 77.04, 53
See application file for complete search history.

(56) References Cited

U.S. PATENT DOCUMENTS

| | | | |
|---|---|---|---|
| 6,046,870 A | 4/2000 | Karube | |
| 6,252,731 B1 | 6/2001 | Sloan et al. | |
| 6,538,839 B1 | 3/2003 | Ryan | |
| 6,754,030 B2 | 6/2004 | Seng et al. | |
| 7,088,535 B2 | 8/2006 | Kim et al. | |
| 7,136,244 B1 | 11/2006 | Rothberg | |
| 7,215,494 B2 | 5/2007 | Wang et al. | |
| 7,813,069 B2 | 10/2010 | Evans et al. | |
| 7,920,350 B2 | 4/2011 | Au et al. | |
| 8,059,353 B1 | 11/2011 | Chen | |
| 8,116,025 B1 | 2/2012 | Chan et al. | |
| 8,149,529 B2 | 4/2012 | Mathew et al. | |
| 8,929,019 B2 | 1/2015 | Tagami et al. | |
| 9,236,099 B2 | 1/2016 | Alhussien et al. | |
| 9,613,652 B2 | 4/2017 | Link et al. | |
| 9,875,763 B1 | 1/2018 | Jury et al. | |
| 9,928,872 B1 | 3/2018 | Jury | |
| 10,014,026 B1 | 7/2018 | Wu et al. | |
| 10,192,570 B2 | 1/2019 | Kawabe et al. | |
| 10,607,648 B1 | 3/2020 | Wu et al. | |
| 10,748,568 B1 * | 8/2020 | Chahwan | G11B 21/12 |
| 10,867,633 B1 | 12/2020 | Liu et al. | |
| 11,018,842 B1 | 5/2021 | Bellorado et al. | |
| 2002/0089778 A1 | 7/2002 | Shimokoshi et al. | |

(Continued)

*Primary Examiner* — Nabil Z Hindi
(74) *Attorney, Agent, or Firm* — Faegre Drinker Biddle & Reath LLP (57) ABSTRACT

An integrated circuit includes a read/write channel and a servo controller. The read/write channel is configured to: determine, in connection with a first path, respective read errors associated with N number of the data sectors; estimate respective offset positions of the N number of the data sectors; and generate a second path based, at least in part, on the respective estimated offset positions. The servo controller is configured to cause adjustment of a position of a read transducer based on the second path.

20 Claims, 6 Drawing Sheets

(56) References Cited

U.S. PATENT DOCUMENTS

2003/0202268 A1   10/2003  Wang et al.
2018/0240483 A1    8/2018  Nylander-Hill \* cited by examiner

MULTI-SECTOR READ OFFSET RECOVERY

SUMMARY

In certain embodiments, a method includes determining an error while attempting to read certain data sectors in a first data track while following a first path, estimating an offset position of each of the certain data sectors, and generating a second path for a read transducer to follow to read data from the certain data sectors based, at least in part, on the estimated offset position.

In certain embodiments, hard disk drive includes a magnetic recording medium comprising data sectors along a data track, a read/write head comprising a read transducer, and an integrated circuit including circuitry. The circuitry is programmed to: determine, in connection with a first path, respective read errors associated with N number of the data sectors; estimate respective offset positions of the N number of the data sectors; and generate a second path based, at least in part, on the respective estimated offset positions.

In certain embodiments, a system-on-a-chip includes a read/write channel and a servo controller. The read/write channel is configured to: determine, in connection with a first path, respective read errors associated with N number of the data sectors; estimate respective offset positions of the N number of the data sectors; and generate a second path based, at least in part, on the respective estimated offset positions. The servo controller is configured to cause adjustment of a position of a read transducer based on the second path.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

When hard disk drives are initially unable to successfully read data from data sectors on a magnetic recording medium, hard disk drives identify the error and try to read the missed data sectors again. This process of identifying the error and then re-reading the missed data sectors is sometimes called error recovery. Re-reading the missed data sectors can be challenging because one common cause for missing data sectors is that the missed data sectors may be misaligned or offset from the center of the data track. As such, following the same path along the center of the data track may result in missing the same data sectors again. Certain embodiments of the present disclosure are accordingly directed to methods and devices for error recovery.

Figure 1:
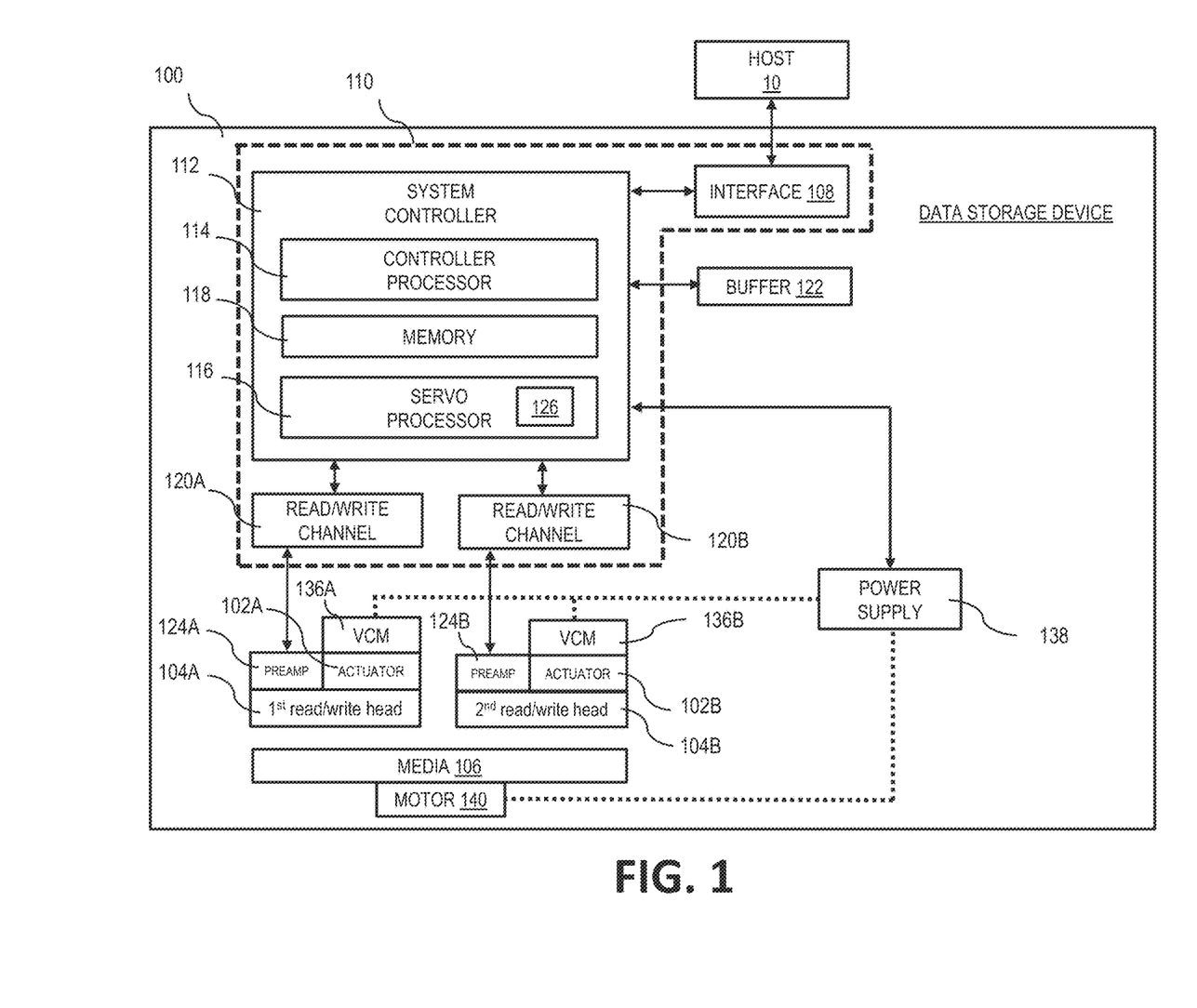
FIG. 1 shows a block diagram of a data storage device, in accordance with certain embodiments of the present disclosure.

FIG. 1 shows a schematic of a data storage device 100 such as a hard disk drive. In the case of a hard disk drive, the data storage device 100 can include multiple actuators (i.e., a first actuator 102A and a second actuator 102B) each with one or more read/write heads 104A and 104B to provide concurrent access to magnetic recording media 106 (e.g., magnetic recording disks, which are referred to as a magnetic recording medium in singular form). In certain embodiments, the multiple actuators 102A and 102B share a common pivot axis and are positioned in a stacked arrangement. In such embodiments, the read/write head(s) 104A coupled to the first actuator 102A access different surfaces of the magnetic recording media 106 than the read/write head(s) 104B coupled to the second actuator 102B. In other embodiments, the multiple actuators 102A and 102B have separate pivot axes. In such embodiments, the read/write head(s) 104A coupled to the first actuator 102A can access the same magnetic recording medium 106 as the read/write head(s) 104B coupled to the second actuator 102B. Although only two actuators for the data storage device 100 are shown in FIG. 1, additional actuators can be incorporated into the data storage device 100 or the data storage device 100 may have only one actuator. The read/write heads 104A and 104B can each comprise a slider with one or more read transducers (e.g., readers, read head) and one or more write transducers (e.g., writers, write head).

The data storage device 100 includes an interface 108 (e.g., an input/output interface) for transferring data to and from the data storage device 100. For example, the interface 108, among other features, can be communicatively coupled between a host 10 (e.g., a laptop, a personal computer, or a data storage system such as a server) and the read/write heads 104A and 104B to facilitate communication, using a standardized communication protocol (e.g., SATA, SAS, SCSI), between the read/write heads 104A and 104B and the host 10.

The data storage device 100 can include a system on a chip ("SOC") 110 (shown in dashed lines) that includes a system controller 112, which can include a controller processor 114 (e.g., a microprocessor), a servo processor 116 (e.g., a microprocessor), and memory 118 coupled to the controller processor 114 and the servo processor 116. The SOC 110 can include multiple distinct banks of memory. For example, one bank of memory 118 can be dedicated to the controller processor 114 and its functions while another bank of memory 118 can be dedicated to the servo processor 116 and its functions (e.g., the memory 118 and the servo processor 116 together functioning as a servo controller 126). The interface 108 may also be part of the SOC 110.

The SOC 110 can also include one or more read/write channels 120A and 120B, which encode and decode data associated with write commands and with read commands. The SOC 110 may be an integrated circuit such as an application-specific integrated circuit ("ASIC") and field-programmable gate array ("FPGA") that includes instructions (e.g., in the form of firmware) for carrying out various functions of the data storage device 100. For example, the SOC 110 can include circuitry to control and carry out various aspects of the data storage device 100 as described in more detail below. Although the interface 108, system controller 112, etc., are shown as being part of a single SOC, the components and their functions can be distributed among several integrated circuits. The system controller 112 can be coupled to and control access to a buffer 122, which can temporarily store data associated with read commands and write commands. The buffer 122 can be a volatile memory, such as a dynamic random access memory ("DRAM"), static random access memory ("SRAM"), or other volatile memory.

During operation, the data storage device 100 receives various data transfer commands (e.g., a read command or a write command) from the host 10. Data associated with a write command may be received from the host 10 by the interface 108 and initially stored to the buffer 122. The data is encoded or otherwise processed by respective read/write channels 120A or 120B and eventually stored to the magnetic recording media 106 via one of the read/write heads 104A or 104B coupled to the respective first actuator 102A or the second actuator 102B. Data associated with a read command may be retrieved from the magnetic recording media 106, processed by one of the read/write channels 120A or 120B, and stored in the buffer 122. Such data is then transferred to the host 10 by the interface 108. In certain embodiments, the servo processor 116 controls operations of respective pre-amplifiers 124A and 124B, which provide signals to the respective read/write heads 104A and 104B for writing magnetic transitions to the magnetic recording media 106 and for receiving signals from the respective read/write heads 104A and 104B in response to detecting magnetic transitions written to the magnetic recording media 106.

Figure 2:
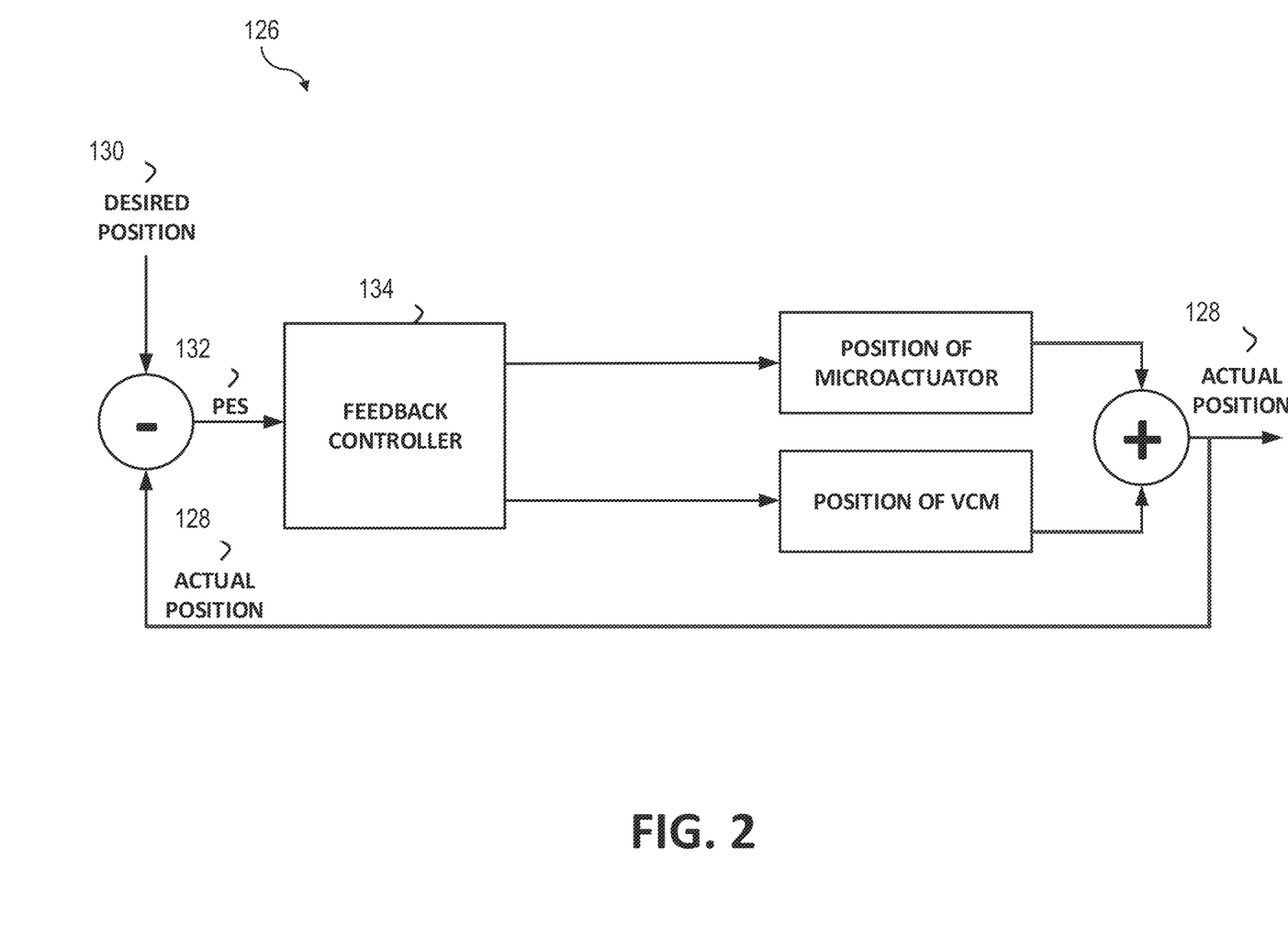
FIG. 2 shows a diagram of a servo control system, in accordance with certain embodiments of the present disclosure.

The data storage device 100 includes a servo controller 126 (schematically shown in more detail in FIG. 2) that is carried out by components of the system controller 112 (e.g., the servo processor 116 and one or more banks of the memory 118). In operation, the read/write heads 104A and 104B read the positioning data from servo sectors stored on the magnetic recording media 106. The read positioning data is processed to determine an actual position 128 (shown in FIG. 2) of the read/write heads 104A and 104B relative to tracks on the magnetic recording media 106. The actual position 128 of the read/write heads 104A and 104B is subtracted from a desired position 130 of the read/write heads 104A and 104B to determine a position error signal (PES) 132 (shown in FIG. 2), which is the difference between where the read/write heads 104A and 104B are and should be positioned. The PES 132 is fed into a feedback controller 134, which controls current to at least one of the voice coil motor (VCM) assemblies 136A, 136B and—for some operations—controls voltage to microactuators to position the read/write heads 104A and 104B over the desired track.

As shown in FIG. 1, the data storage device 100 includes a power supply 138, (e.g., an amplifier) which is controlled by the system controller 112. The power supply 138 supplies current to a motor 140 (e.g., spindle motor), which rotates the magnetic recording media 106. The power supply 138 also supplies current to VCM assemblies 136A and 136B. In certain embodiments, the power supply 138 is an integrated circuit, which includes electronics (e.g., voice coil driver electronics) designed to provide current to the VCM assemblies 136A and 136B.

The VCM assemblies 136A and 136B are used to position (e.g., rotate) the actuators 102A and 102B to position the read/write heads 104A and 104B over a desired data track on the magnetic recording media 106 for data reading and data writing operations. For example, in response to a command to read data from or write data to a data track located a certain distance away from where a respective read/write head 104A or 104B is currently positioned (i.e., a track-seeking operation), a current may be supplied by the power supply 138 and applied to the voice coil of the respective VCM assemblies 136A and 136B to rotate the respective actuators 102A and 102B (and therefore the respective read/write heads 104A and 104B) towards the desired data track. The applied current through the coil generates a magnetic field that interacts with magnets of the VCM assemblies 136A and 136B. The applied current may follow a current profile determined by and commanded by the servo processor 116. As the respective read/write heads 104A and 104B near the desired data track, less current is applied to the VCM assemblies 136A and 136B such that the read/write heads 104A and 104B begin to settle over the desired data track (i.e., a track-settling operation). Once the respective read/write heads 104A and 104B are positioned over the desired data track, the servo control system 126 compensates for small positioning errors (i.e., a track-follow operation) to keep the desired read/write heads 104A and 104B over the desired data tracks on the magnetic recording medium 106 during a read operation or a write operation.

Figure 3:
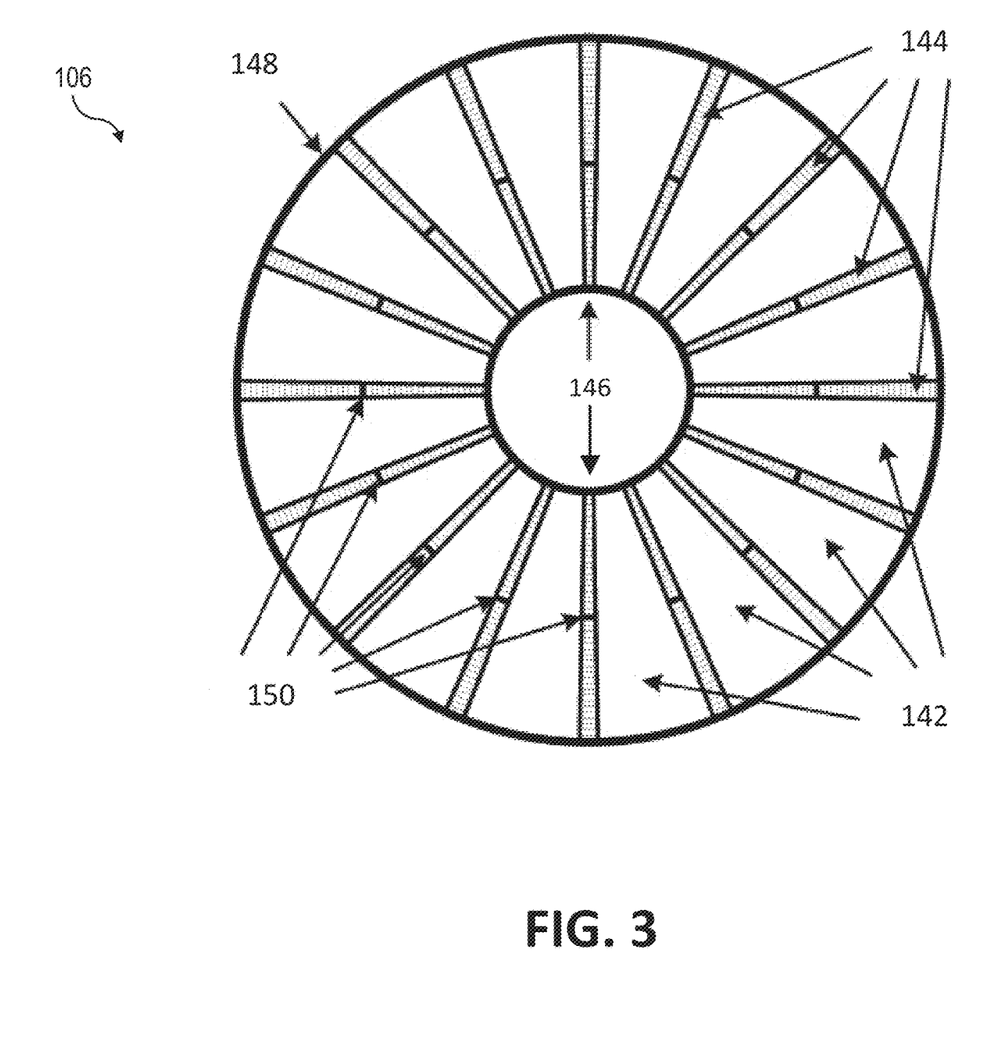
FIG. 3 shows a magnetic recording medium, in accordance with certain embodiments of the present disclosure.

FIG. 3 shows a top view of one side of one of the magnetic recording media 106. Data is written to the magnetic recording medium 106 along tracks, which may be sequentially numbered in accordance with their radial position. For example, track zero may be located adjacent to an outer diameter of the magnetic recording medium 106 and a last track may be located adjacent to an inner diameter of the magnetic recording medium 106.

The tracks of the magnetic recording medium 106 can include user data regions 142 and servo data regions 144 (which are sometimes referred to as servo wedges) positioned between the user data regions 142. The servo wedges 144 extend radially between an inner diameter 146 and an outer diameter 148 of the magnetic recording medium 106. Data on the magnetic recording media 106 is stored on data tracks which extend circumferentially around the top/bottom surfaces of each magnetic recording medium 106. The portion of the data tracks in the user data regions 142 store user data, and the portion of the data tracks in the servo wedges 144 are comprised of individual servo sectors 150 (some of which are shaded in FIG. 3), which store servo data. As such, each servo wedge 144 includes a plurality of servo sectors 150. As shown in FIG. 3, the servo wedges 144 can be positioned at regular intervals around the magnetic recording medium 106. In some embodiments, the magnetic recording medium 106 may have on the order of hundreds (e.g., 200) of servo wedges 144.

Figure 4:
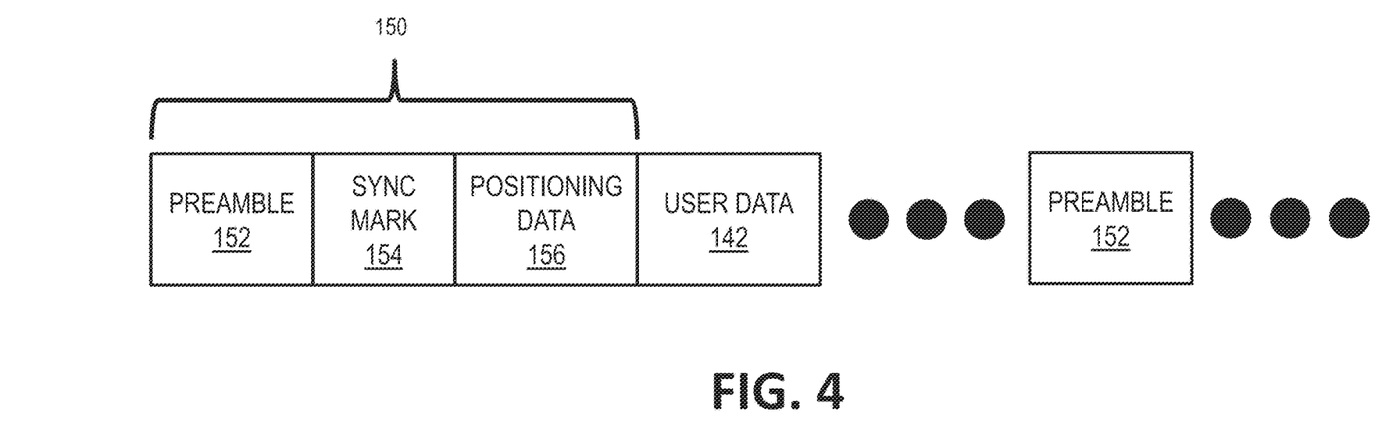
FIGS. 4-7 show partial, ribbon schematics of a data track, in accordance with certain embodiments of the present disclosure.

FIG. 4 shows an example of the type of servo data stored to the servo sectors 150. The servo sectors 150 can include a preamble 152 (e.g., a fixed pattern indicating the beginning of the servo sector 150) followed by what may be referred to as a sync mark 154 (e.g., a synchronization pattern) or a servo timing mark. For example, the preamble 152 may be written with an alternating pattern of magnetic transitions which, when read, generates a sine-wave like read-back signal. When the servo control system identifies the preamble 152, the servo control system may then search for an expected sync mark 154. Once the sync mark 154 is detected, the servo control system can then read positioning data 156 following the sync mark 154 from the servo sectors 150. The positioning data 156 specifies the physical radial and tangential location of the given servo sector 150 on the magnetic recording medium 106. As the read/write heads 104A and 104B pass over each servo sector 150, the servo sector's information is demodulated such that the position of the read/write heads 104A and 104B is known. The detected actual position of the read/write heads 104A and 104B is used by the servo controller 126 to determine and correct when the actual position is suboptimal.

Servo data is written to both sides of the magnetic recording medium 106 by, for example, a servo writer or disk writer before the magnetic recording medium 106 is installed in the data storage device 100 or by the data storage device 100 itself using a process referred to as self-servo track writing (SSW) or concentric SSW process. SSW may include using the electronics (e.g., the SOC 110) of the data storage device 100 to write the concentric servo sectors independent of an external servo writer.

The read/write channels 120A and 120B, the preamplifiers 124A and 124B, and various components of the system controller 112 operate so that the servo data read by the read/write heads 104A and 104B can be processed and used by the data storage device 100 to maintain proper positioning of the read/write heads 104A and 104B.

Figure 5:
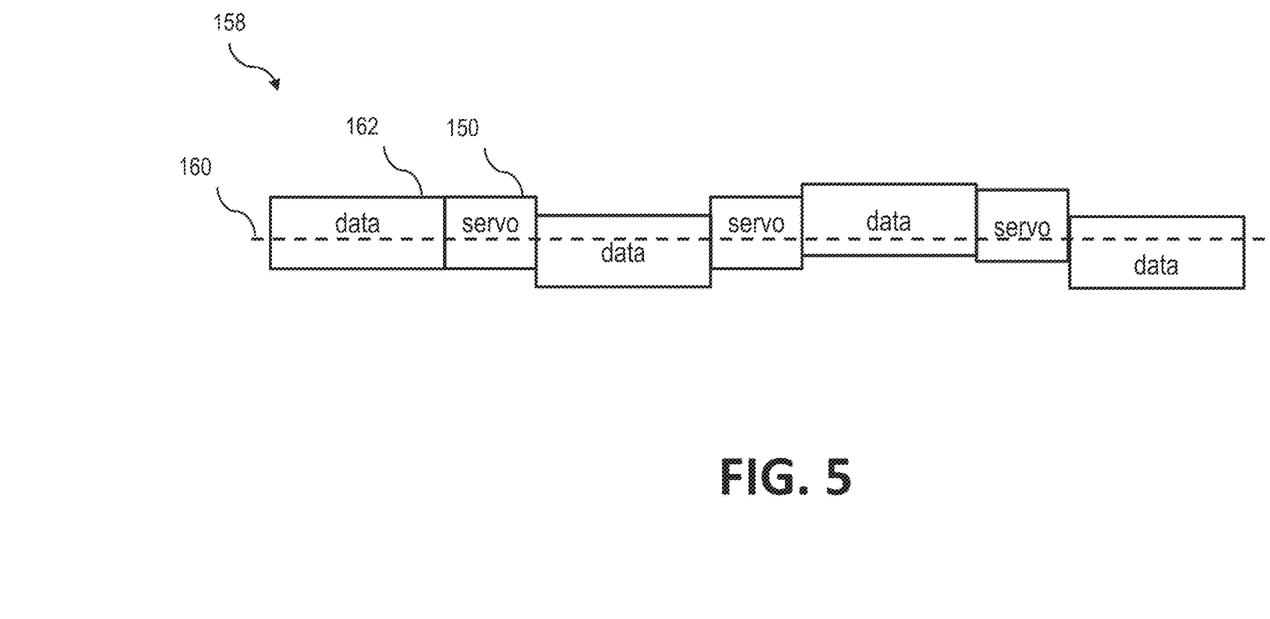

FIG. 5 shows a partial, ribbon view of a data track 158 for the magnetic recording medium 106. The magnetic recording medium 106 may have millions of data tracks stored on it. The data track 158 has a centerline 160. In some embodiments, the centerline 160 is the average centerline of data sectors along the data track 158. The data track 158 includes data sectors 162 positioned between the servo sectors 150. Many data sectors 162 can be positioned along the data track 158 in the section with the user data 142 (shown in FIGS. 3 and 4). As such, there can be multiple distinct data sectors 162 (e.g., data sectors with unique addresses) positioned between the servo sectors 150 along the data track 158.

As shown in FIG. 5, at least some of the data sectors 162 and servo sectors 150 may be offset (e.g., radially offset) from the centerline 160 of each data track 158. For example, the centerline of a given sector may be offset from (e.g., not aligned with) the centerline 160 of the data track 158. As noted above, the misalignment may cause errors when attempting to read data from the misaligned data sectors 162.

Figure 6:
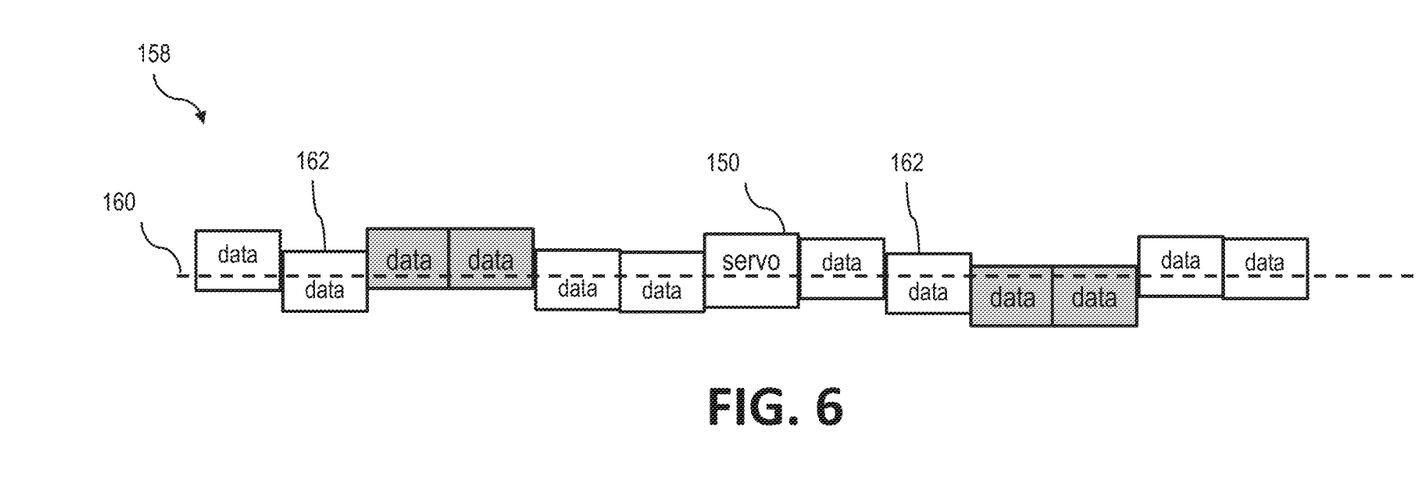

FIG. 6 shows a more granular view of two sets of consecutive data sectors 162 with one servo sector 150 (e.g., a portion of a servo wedge) positioned between the two sets of data sectors 162. As shown, the data sectors 162 are not perfectly aligned along the centerline 160 of the data track 158. Instead, some data sectors 162 may have their centerlines positioned above the centerline 160 (and therefore closer to the outer diameter of the magnetic recording medium) while other data sectors 162 may have their centerlines positioned below the centerline 160 (and therefore closer to the inner diameter of the magnetic recording medium).

In FIG. 6, the data sectors with shaded coloring represent data sectors that caused an initial read error as the read transducer of the read/write head attempted to read data from the data track 158. Because of the initial read error the SOC 110 of the data storage device 100 may be programmed to carry out various error correction routines. One error correction routine involves attempting to reread the data sectors that caused an initial read error (sometimes called failed data sectors). However, as noted above, attempting to follow the same path along the centerline 160 of the data track 158 may result is failing to read the same failed data sectors.

Some reread approaches involve offsetting the read/write head a pre-determined amount in a positive direction or negative direction, attempting to reread the failed data sectors, offsetting the read/write head in an opposite direction, and again attempting to reread the failed data sectors. However, this approach takes multiple revolutions of the magnetic recording medium and still may not result in successful reading of the failed data sectors.

The description below outlines approaches for retrying to read data of failed data sectors in a single revolution and/or with an increased chance of success. In short, a customized path (e.g., trajectory) for the read transducer of the read/write head is generated based on estimated read offsets of each failed data sector. This customized path attempts to more closely align the read transducer with centerlines of the failed data sectors.

Using the FIG. 6 example, in attempting to read data from the data track 158, a read/write head is positioned such that a read transducer attempts to follow the centerline 160 of the data track 158. As noted above, during the initial read operation, data from some of the data sectors 162 may be missed due to one or more of the data sectors 162 being offset from the centerline 160 of the data track 158. In FIG. 6, these missed data sectors 162 are shaded.

The SOC 110 of the data storage device 100 may determine that certain data sectors 162 were not successfully read. These missed data sectors 162 can be distributed throughout the data track 158. For example, as shown in FIG. 6, the missed data sectors 162 can be non-consecutive (e.g., separated by data sectors 162 successfully read) with respect to each other. Further, the missed data sectors 162 may be positioned in different sections of user data. For example, one or more missed data sectors 162 may be positioned on one side of a servo sector while another one or more missed data sectors 162 may be positioned on the other side of the servo sector.

Once the SOC 110 detects a missed data sector 162, the SOC 110 may determine that a read error has occurred and initiate one or more error recovery routines. One of the error recovery routines can include estimating an offset position of each of the missed data sectors 162. In certain embodiments, the estimated offset position includes a direction (e.g., positive or negative radial direction with respect to the centerline 160) and an offset amount. The offset amount can be determined in terms of a percentage of a pitch of the data track 158. The offset amount can attempt to estimate a difference between the centerline 160 of the data track 158 and respective centerlines of the missed data sectors 162. Separate offset positions can be estimated for each missed data sector 162.

In certain embodiments, the offset positions of the missed data sectors 162 are estimated based on information collected during the first attempt. For example, the offset positions can be based, at least in part, on a position error signal generated during the first attempt at reading the data sectors 162.

In some embodiments, the offset positions of the missed data sectors 162 are estimated based on information collected during a subsequent attempt at reading the data sectors 162. This subsequent attempt may be a read-retry operation initiated once a read error is detected. Waiting until the subsequent read attempt can help address errors caused by factors such as seek-settle effects. However, waiting may increase the overall time consumed by the error recovery process.

In certain embodiments, the offset positions of the missed data sectors 162 are estimated based on information collected either during the first attempt or during subsequent attempt at reading the data sectors 162—depending on certain factors. As one example, when an error is detected while carrying out a sequential read (during which seek-settle effects are limited), the offset positions may be estimated using information collected during the first read attempt rather than a subsequent read attempt. Another example involves using information from the first read attempt when the detected error is associated with a data sector positioned in the last half (e.g., second semicircle) of the data track 158. In this example, the read-write head is likely to have settled by the time the later data sector is read, so the information collected during first attempt is not largely affected by seek-settle issues.

U.S. patent application Ser. No. 17/410,840 (filed Aug. 24, 2021) and Ser. No. 17/466,327 (filed Sep. 3, 2021) describe approaches for estimating offset positions and are hereby incorporated by reference for such purposes. U.S. patent application Ser. No. 17/466,327 (filed Sep. 3, 2021) is also hereby incorporated by reference for purposes of disclosing embodiments featuring read/write heads with multiple read transducers.

Figure 7:
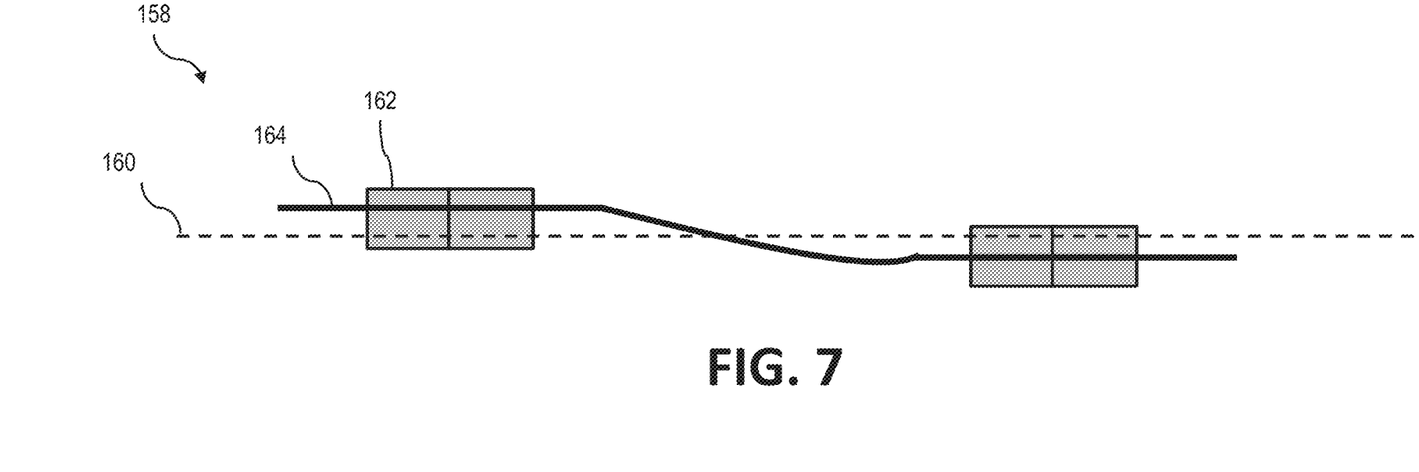

FIG. 7 shows the data track 158 and only the missed data sectors 162 from FIG. 6. Using the estimated offset positions, the SOC can generate a new path 164 (e.g., trajectory) for the read transducer of the read/write head to follow while attempting to reread the missed data sectors 162. The new path can attempt to pass over estimated centers of the missed data sectors 162 which helps increase the chance that data from the missed data sectors 162 can be successfully read.

As shown in FIG. 7, the new path 164 can pass through data sectors 162 offset above and below the centerline 160 of the data track 158 as well as data sectors 162 that are not immediately adjacent to each other. In some embodiments, the new path 164 will pass through multiple data sectors 162 at different offset locations on only one side of the centerline 160 of the data track 158. Regardless of the specific path taken, the new path allows for rereading and recovering data from multiple data sectors 162 (consecutive or non-consecutive) during a single revolution of the magnetic recording medium.

In certain embodiments, the new path 164 can be generated by creating a path that passes through N points, where N is the number of missed data sectors 162. In the example of FIG. 7, the new path 164 would include 4 points through which it was designed to pass over. Each point can be described in terms of the estimated offset position and a number or location (e.g., an address) within the data track 158. The sections of the new path 164 located between points can be generated to reduce the risk of inducing vibrations that cause the read transducer to travel away from the new path 164. For example, these sections of the new path 164 can comprise smooth, linear transitions between adjacent points.

In certain situations, even if the new path 164 is followed, some data sectors 162 will be missed again and should be attempted to be read again. Using one approach, a second new path is generated and is designed to pass over the centerlines of the data sectors 162 that remain unread. As such, the data sectors 162 that were successfully recovered using the new path 164 do not contribute to generating the second new path.

In certain situations, adjacent missed data sectors 162 have estimated offset positions that are too far apart for a read/write head to successfully move from one data sector centerline to the next centerline in time. These disparate offset positions may be a result of the data sectors being written during different write commands. Another possible cause is that the centerline of a data sector can be "pushed" as a result of writing a data sector on a data track that is adjacent to the data sector of interest. In these situations, the SOC can apply additional techniques.

One technique involves creating two new paths where a first new path is designed to pass over centerlines of a first set of missed data sectors and a second new path is designed to pass over centerlines of a second set of missed data sectors. These sets of missed data sectors can be mutually exclusive sets. Two sets can be grouped by the similarity of their estimated offset position and/or how closely spaced adjacent missed data sectors are from each other. The first new path is used during one revolution of the magnetic recording medium while the second new path is used during another revolution of the magnetic recording medium.

Another technique involves applying one or more constraints when generating the new path 164. One example constraint involves generating a path that minimizes—over all missed data sectors 162—the squared error between the estimated offset position and points along the actual generated path. Another example constraint involves applying minimums and maximums such as a maximum radial offset per length along the data track 158.

In certain embodiments, the new path 164 can be generated based on calculating the average of the individual estimated offset positions of the missed data sectors 162. The description below outlines details for using averages.

Equation 1 below describes the new path 164 (denoted by $T_0$) as a function of the initial set of missed data sectors 162 (denoted by $F_0$) and individual estimated offset positions (denoted by $R_0$):

$$T_0 = f(F_0, R_0) \tag{1}$$

Given the initial set of missed data sectors—$F_0 = \{f_0,1, f_0,2, \ldots, f_0,N_0\}$—and corresponding estimated offset positions—$R_0 = \{r_0,1, r_0,2, \ldots, r_0,N_0\}$—the SOC generates the new path 164 which is intended to pass the read transducer over each of the missed data sectors at the estimated offset position. Ideally, $T_0$ would equal $R_0$. However, if constraints are used when generating the new path 164, $T_0$ will not equal $R_0$.

As noted above, when the read transducer follows the new path 164, some of the initially missed data sectors may be missed again. A second new path can be generated based on the remaining missed data sectors and estimated offset positions: $F_1 = \{f_1,1, f_1,2, \ldots, f_1,N_1\}$ and $R_1 = \{r_1,1, r_1,2, \ldots r_1,N_1\}$.

Although two estimates offset positions have been calculated for each remaining missed data sector, averaging the two positions may not be helpful because the position of the read transducer has been modified between the first read operation and the first reread operation. However, because the modified position is known (e.g., from the new path, $T_0$), the modified position can be used to calculate an average estimated offset position, denoted as $G_1$ in equation 2 below. The remaining missed data sectors will be associated with an $f_0$ and $f_1$ with estimated offset positions $r_0$ and $r_1$ and an actual offset $T_0$ when $r_1$ information was collected. Therefore, an average for each remaining missed data sector can be made using $(r_0 + (r_1 - t_0))/2$. The averaged estimated offset positions can be used to generate a second new path:

$$T_1 = f(F_1, G_1) \tag{2}$$

This concept can be extended to the kth revolution:

$$T_k = f(F_k, G_k) \tag{3}$$

As such, the SOC can use averaging to generate updated paths for attempting to recover data from remaining missed data sectors.

Figure 8:
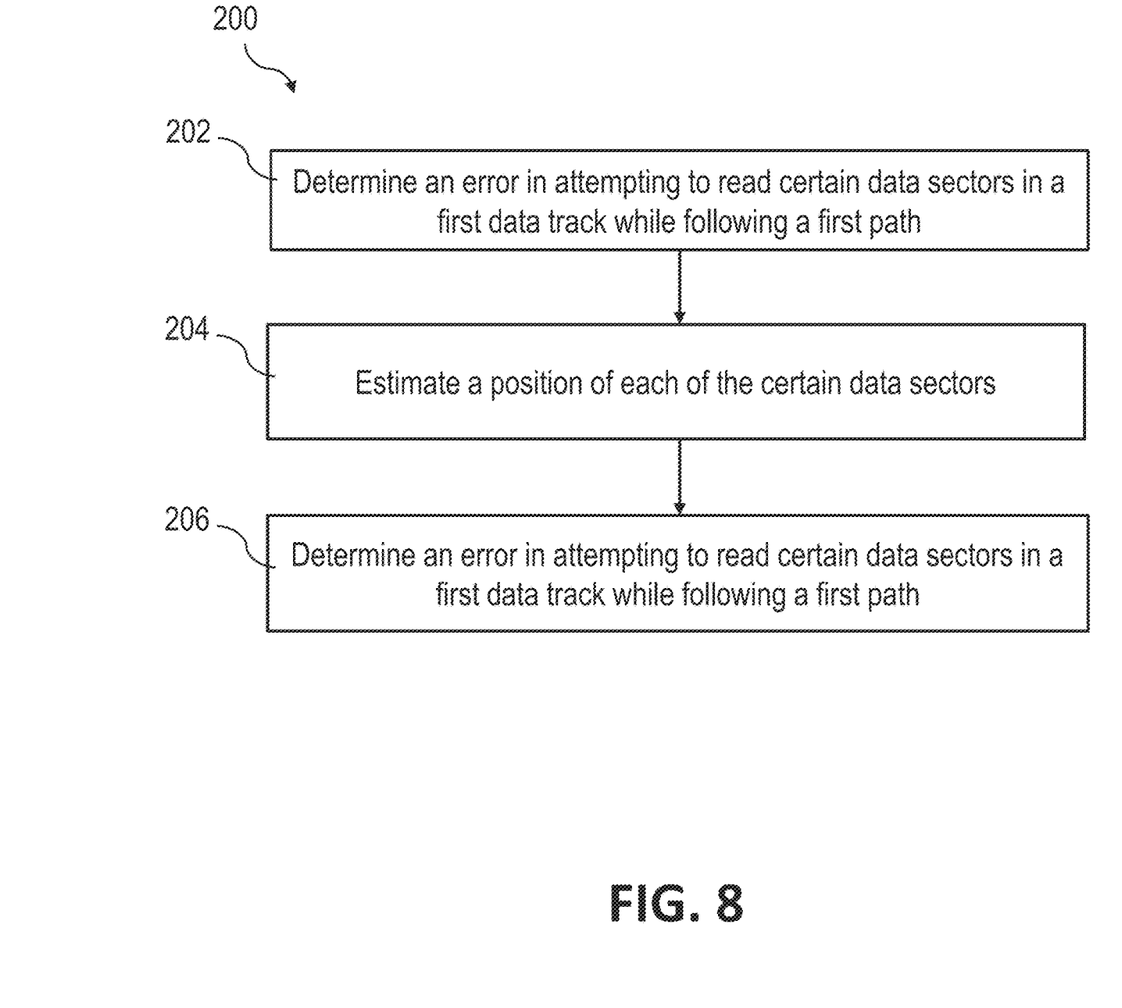
FIG. 8 shows a block diagram of a method, in accordance with certain embodiments of the present disclosure.

FIG. 8 outlines a method 200 for recovering data from missed data sectors. The method 200 includes determining an error while attempting to read certain non-consecutive data sectors in a first data track while following a first path (block 202 in FIG. 8). The method 200 further includes estimating an offset position of each of the certain non-consecutive data sectors (block 204 in FIG. 8). The method 200 further includes generating a second path for a read transducer to follow to read data from the certain non-consecutive data sectors based, at least in part, on the estimated offset position (block 206 in FIG. 8). The various processes described above can be carried out by the SOC 110 (shown in FIG. 1).

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A method comprising:
   determining an error while attempting to read certain data sectors in a first data track while following a first path;
   estimating an offset position of each of the certain data sectors;
   generating a second path for a read transducer to follow to read data from the certain data sectors based, at least in part, on the estimated offset position; and
   attempting to reread data from the certain data sectors while following the second path, wherein the data sectors are non-consecutive with respect to each other.

2. The method of claim 1, wherein the estimated offset position includes a direction.

3. The method of claim 2, wherein the direction includes either a positive radial direction or a negative radial direction.

4. The method of claim 1, wherein the offset position is based on a positive or negative percentage of a pitch of the first data track.

5. The method of claim 1, wherein the first path is along a centerline of the first data track.

6. The method of claim 1, wherein the attempting is carried out in a single revolution of a data storage medium for all missed data sectors of the data track.

7. The method of claim 1, further comprising:
   generating a third path.

8. The method of claim 7, wherein the third path is generated to pass over any remaining missed data sectors after following the second path.

9. The method of claim 7, wherein the third path is based, at least in part, on an average estimated offset position.

10. A hard disk drive comprising:
    a magnetic recording medium comprising data sectors along a data track;
    a read/write head comprising a read transducer; and
    an integrated circuit including circuitry programmed to:
       determine, in connection with a first path, respective read errors associated with N number of the data sectors of the data track,
       estimate respective offset positions of the N number of the data sectors of the data track, and
       generate a second path along the same data track based, at least in part, on the respective estimated offset positions.

11. The hard disk drive of claim 10, wherein the circuitry is further programmed to:
    adjust the read/write head to follow the second path.

12. The hard disk drive of claim 11, wherein the circuitry is further programmed to:
    determine, in connection with the second path, respective read errors of a subset of the N number of the data sectors, and then
    generate a third path.

13. The hard disk drive of claim 12, wherein the third path is based, at least in part, on an average of estimated offset positions.

14. The hard disk drive of claim 10, wherein the second path crosses a centerline of the data track and passes over a servo sector.

15. A system-on-a-chip (SOC) comprising:
    a read/write channel configured to:
       determine, in connection with a first path, respective read errors associated with N number of the data sectors,
       estimate respective first offset positions of the N number of the data sectors,
       generate a second path based, at least in part, on the respective estimated first offset positions,
       determine, in connection with the second path, respective read errors associated with a subset of the N number of the data sectors,
       estimate respective second offset positions of the subset, and
       generate a third path; and
    a servo controller configured to:
       cause adjustment of a position of a read transducer based on the second path.

16. The SOC of claim 15, wherein the read/write channel is configured to generate the third path based, at least in part, on the respective first offset positions associated with the subset, the respective second offset positions, and the second path.

17. The SOC of claim 15, wherein the read/write channel is configured to generate a fourth path, wherein the third path is designed to pass over a first subset of the N number of the data sectors, wherein the fourth path is designed to pass over a second subset of the N number of the data sectors.

18. The SOC of claim 17, wherein the first subset and the second subset are mutually exclusive subsets of the data sectors of mutually exclusion.

19. The SOC of claim 15, wherein the first path, the second path, and the third path are along the same data track.

20. The SOC of claim 15, wherein the third path is based, at least in part, on an average estimated offset position.

* * * * *

UNITED STATES PATENT AND TRADEMARK OFFICE
CERTIFICATE OF CORRECTION

| | | |
|---|---|---|
| PATENT NO. | : 11,562,767 B1 | |
| APPLICATION NO. | : 17/469301 | |
| DATED | : January 24, 2023 | |
| INVENTOR(S) | : Ara Patapoutian et al. | |

It is certified that error appears in the above-identified patent and that said Letters Patent is hereby corrected as shown below:

In the Claims

Claim 18
Line 2-3, "mutually exclusive subsets of the data sectors of mutually exclusion" should read
-- mutually exclusive subsets of the data sectors --

Signed and Sealed this
Second Day of May, 2023

Katherine Kelly Vidal
*Director of the United States Patent and Trademark Office*